United States Patent
Kato

(10) Patent No.: US 6,662,755 B2
(45) Date of Patent: Dec. 16, 2003

(54) HARNESS FOR PET

(75) Inventor: Osamu Kato, Tokyo (JP)

(73) Assignee: Poochie-Pompreece Co., Ltd., Tokyo (JP)

( * ) Notice: Subject to any disclaimer, the term of this patent is extended or adjusted under 35 U.S.C. 154(b) by 0 days.

(21) Appl. No.: 09/985,487

(22) Filed: Nov. 5, 2001

(65) Prior Publication Data

US 2002/0053324 A1 May 9, 2002

(30) Foreign Application Priority Data

Nov. 9, 2000 (JP) ....................................... 2000-341809
Aug. 6, 2001 (JP) ....................................... 2001-237245

(51) Int. Cl.[7] ............................. A01K 27/00; B68C 5/00
(52) U.S. Cl. ........................ 119/856; 54/79.1; D30/152
(58) Field of Search ................................ 119/856, 863; 54/79.1; D30/145, 151

(56) References Cited

U.S. PATENT DOCUMENTS

| | | | | |
|---|---|---|---|---|
| 5,769,030 A | * | 6/1998 | Acoff | 119/856 |
| 5,913,285 A | * | 6/1999 | Pritchard | 119/856 |
| 6,167,844 B1 | * | 1/2001 | Cantrell et al. | 119/856 |
| D445,547 S | * | 7/2001 | Howitz et al. | D30/145 |
| 6,325,024 B1 | * | 12/2001 | Masukawa | 119/856 |

* cited by examiner

Primary Examiner—Charles T. Jordan
Assistant Examiner—Elizabeth Shaw
(74) Attorney, Agent, or Firm—Oblon, Spivak, McClelland, Maier & Neustadt, P.C.

(57) ABSTRACT

A harness for a pet capable of preventing troubles such as reversal and torsion of a collar section and/or a harness section, a failure in control of a pet by an owner, a failure in comfortable movement of the pet and the like. A collar section, a harness section, and a connection band and a connection sections each for connecting the collar and harness sections to each other therethrough are formed into an increased width in conformity to a body of a pet and so as to be continuous with each other. The harness section has a back portion formed so that a length thereof may be adjusted. The connection band is formed into a loop. The harness section has a back portion inserted through the loop of the connection band in a manner to be movable in both longitudinal and lateral directions of the harness. Further, a lead is connected to the loop of the connection band either through the lead connection ring fitted on the connection band so as to be movable in the longitudinal direction or by fitting a distal end of the lead on the connection band so as to be movable in the longitudinal direction.

4 Claims, 8 Drawing Sheets

HARNESS FOR PET

BACKGROUND OF THE INVENTION

This invention relates to a harness for a pet, and more particularly to a harness through which a lead is connected to a pet such as a dog or the like.

FIELD OF THE INVENTION

DISCUSSION OF THE BACKGROUND

Equipment which has been conventionally used for connecting a lead to a pet such as a dog or the like typically include a collar adapted to be wound on a neck of a pet, as well as a harness. The conventional harness generally includes a collar section wound on a neck of a pet, a harness section mounted on a region of a trunk of the pet positioned immediately rearwardly of forelegs of the pet, a back-side connection band for connecting the collar section and harness section to each other therethrough on a back side of the pet, and a ventral-side connection band for connecting the collar and harness sections to each other therethrough on a ventral side thereof. The collar section, harness section and both connection bands are formed so as to be continuous with each other. Also, the harness is constructed so as to permit a lead to be connected to the backside connection band.

In general, a harness is soft and comfortable to a pet and reduces a burden applied thereto, as compared with a collar fitted on a neck of a pet for the purpose of taking the pet about, although the former is somewhat troublesome or awkward to handle as compared with the latter. Also, the harness is highly advantageous to a pet owner in that it is hard to release from a pet and easy to control it because of permitting a neck of the pet and a trunk thereof to be concurrently pulled therethrough.

However, in the conventional harness, the neck section, harness section and connection bands or sections each are constituted by a tape reduced and uniform in width such as a nylon plain weave strap, a synthetic leather strap, a natural leather strap or the like. Although such configuration permits a reduction in manufacturing costs, it causes the sections to bite into the body of a pet, to thereby charge a physical burden on the pet, because of a reduced width of the sections. Also, the conventional harness is so configured that the lead or a ring for connecting the lead to the harness section is stationarily fixed on the harness section, and the collar section, harness section and connection sections are fixed to each other by sewing or the like. This fails to permit the harness to exhibit both mechanical flexibility and operational flexibility, leading to problems such as a reversal of the collar section and/or harness section, torsion thereof, displacement of the whole harness from a back of the pet to a side thereof, a failure in controlling of the pet by an owner thereof, a failure to ensure comfortable movement of the pet and the like when the pet is moving about during a walk thereof.

SUMMARY OF THE INVENTION

The present invention has been made in view of the foregoing disadvantage of the prior art.

Accordingly, it is an object of the present invention to provide a harness for a pet which is capable of satisfactorily or conveniently fitting to a body of a pet, to thereby-provide the pet with both a soft feeling and comfortableness.

It is another object of the present invention to provide a harness for a pet which is capable of preventing a pat from being hard to move due to torsion of the whole harness or displacement thereof by back and forth movement of the pet during a walk thereof.

It is a further object of the present invention to provide a harness for a pet which is capable of preventing reversal and/or torsion of a collar section and/or a harness section due to back and forth movement of a pet during a walk thereof.

In accordance with the present invention, a harness for a pet is provided. The harness includes a collar section, a harness section, a connection section for connecting the collar section and harness section to each other therethrough on a ventral side, a connection band for connecting the collar section and harness section to each other therethrough on a back side. In the harness generally constructed as described above, the collar section, the harness section, and the connection section for connecting the collar and harness sections to each other therethrough are formed into an increased width in conformity to a body of a pet and so as to be continuous with each other. The harness section has a back portion formed so that a length thereof may be adjusted. The connection band through which the collar section and harness section are connected to each other on the back side is formed into a loop. The harness section has a back portion inserted through the loop of the connection band in a manner to be movable in both longitudinal and lateral directions of the harness. The harness also includes a lead connected to the loop of the connection band either through a lead connection ring fitted on the connection band so as to be movable in the longitudinal direction or by fitting a distal end of the lead on the connection band so as to be movable in the longitudinal direction.

In a preferred embodiment of the present invention, the collar section, harness section and connection section are formed into an increased width and so as to be continuous with each other. The collar section is formed at a front portion thereof with a cuirass increased in width.

In a preferred embodiment of the present invention, the harness section is formed on a back side thereof with a tape-like portion reduced in width. The tape-like portion has a length adjustably formed and is inserted through the loop of the connection band in a manner to be movable in both longitudinal and lateral directions.

Also, in accordance with the present invention, a harness for a pet is provided. The harness includes a collar section of which a length is adjustable, a harness section, a connection band for connecting the collar and harness sections to each other therethrough on a back side, and a connection section for connecting the collar and harness sections to each other therethrough on a ventral side. The collar section, harness section, connection band and connection section are formed so as to be continuous with each other. The connection band is formed into a loop. The harness further includes a lead connected to the loop of the connection band either through a lead connection ring fitted on the connection band so as to be movable in a longitudinal direction of the harness or by fitting a distal end of the lead on the connection band so as to be movable in the longitudinal direction.

In a preferred embodiment of the present invention, the connection band is provided thereon with a wing-like or ala-like decoration.

In a preferred embodiment of the present invention, the decoration is formed in imitation of any one selected from the group consisting of a wing of a cupid, an ala of an insect, and other wings and alae.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DESCRIPTION OF THE PREFERRED EMBODIMENTS

Figure 1:
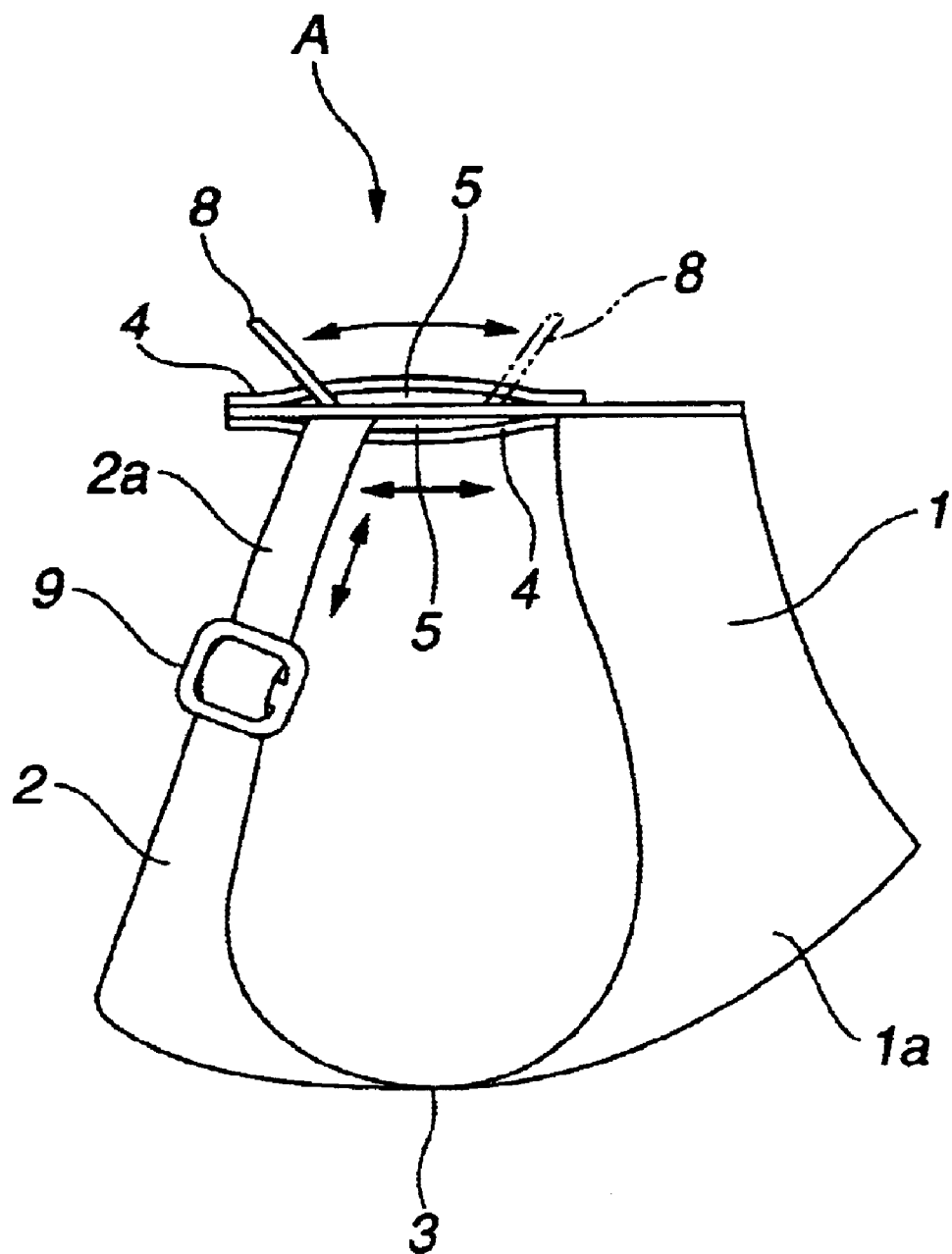
FIG. 1 is a front elevational view showing an embodiment of a harness according to the present invention.
Figure 2:
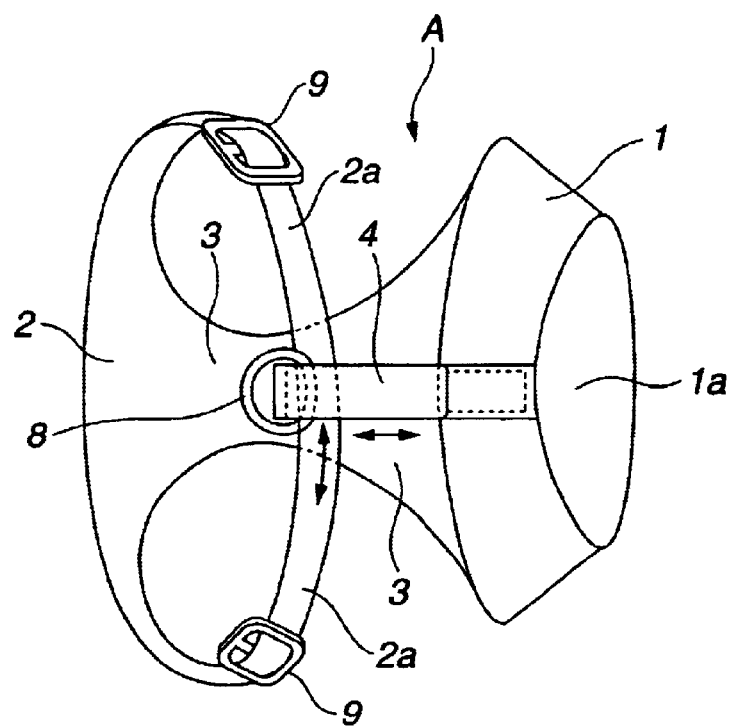
FIG. 2 is a plan view of the harness shown in FIG. 1.
Figure 3:
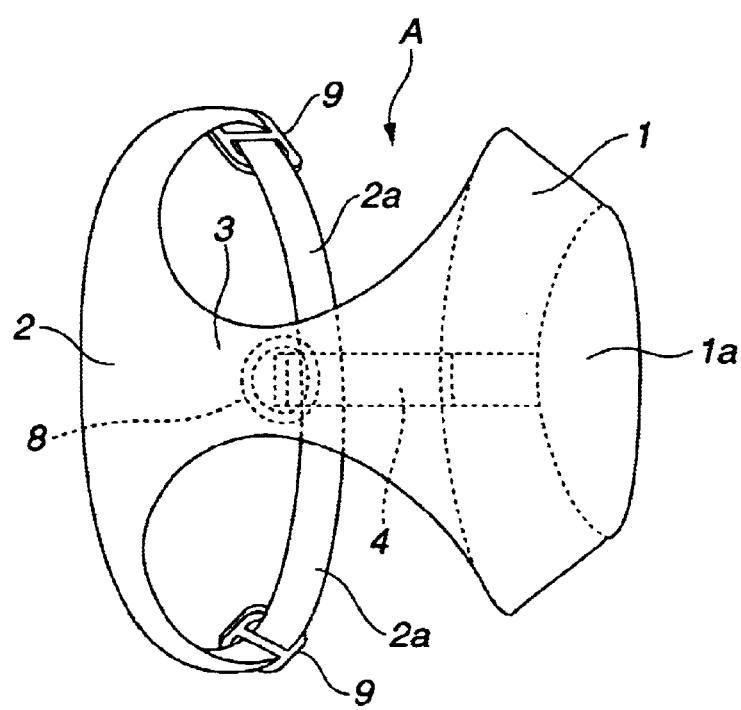
FIG. 3 is a bottom view of the harness shown in FIG. 1.

Now, a harness according to the present invention will be described with reference to the accompanying drawings.

Referring first to FIGS. 1 to 4, a first embodiment of a harness according to the present invention is illustrated. A harness of the illustrated embodiment which is generally designated at reference character A generally includes a collar section 1, a harness section 2, a connection section 3 for connecting the collar section 1 and harness section 2 to each other therethrough on a ventral side of a pet 6 such as a dog, a connection band 4 for connecting the collar and harness sections 1 and 2 to each other therethrough on a back side thereof. The collar section 1 and harness section 2 as well as the connection section 3 for connecting both to each other therethrough are formed into an increased width in conformity to a body of the pet 6 and so as to be continuous with each other. The harness section 2 has a back side portion 2a formed so as to permit a length thereof to be adjustable. The connection band 4 through which the collar section 1 and harness section 2 are connected to each other on the back side is formed into a loop 5. The harness section 2 has a back portion 2a inserted through the loop 5 of the connection band 4 in a manner to be movable in both longitudinal and lateral directions of the harness. The harness A of the illustrated embodiment constructed as described above may have a lead 7 connected thereto. The lead 7 may be connected to the harness A either directly or indirectly so as to be movable in the longitudinal direction with respect to the harness A. More particularly, the lead 7 may be inserted at a distal end thereof via the loop 5 of the connection band 4 in a manner to be movable in the longitudinal direction while being held on the connection band 4, resulting in being directly connected to the connection band 4. Alternatively, it may be indirectly connected to the connection band 4 through a lead connection ring 8 fitted on the connection band 4 in a manner to be movable or slidable along the loop 5 of the connection band 4.

In the harness A of the illustrated embodiment thus constructed, as required, the collar section 1, harness section 2 and connection section 3 may be formed into an increased width and the collar section 1 may be formed at a front portion thereof with a cuirass-like portion 1a increased in width.

Also, in the illustrated embodiment, the harness section 2 may be formed at the back side portion 2a thereof with a tape-like portion reduced in width. The tape-like portion may be formed so as to permit a length thereof to be adjustable by means of an adjustment means 9 or the like. Also, the tape-like portion may be inserted through the loop 5 of the connection band 4 in a manner to be movable in both longitudinal and lateral directions of the harness A.

Referring now to FIGS. 5 to 10, a second embodiment of a harness according to the present invention is illustrated. A harness of the illustrated embodiment which is generally designated at reference character B is constructed in such a manner that a harness section 12 and a collar section 11 constructed so as to permit a length thereof to be variably adjustable are connected to each other through a connection band 14 on a back side of a pet and through a connection section 13 on a ventral side thereof. This results in four such sections and band being connected in a manner to be integral or continuous with each other. In the illustrated embodiment, the connection band 14 is formed into a loop. Also, a lead 7 is provided so as to be connected to the loop of the connection band 14 either through a lead connection ring 8 fitted on the connection band 14 so as to be movable in a longitudinal direction of the harness B or by fitting a distal end of the lead 7 on the connection band 14 so as to be movable in the longitudinal direction.

The collar section 11, harness section 12, connection band 14 and connection section 13 each may be formed of any suitable material such as fiber, synthetic leather, natural leather or the like into a tape-like configuration. The collar section 11 and harness section 12 each have a length formed so as to be adjustable by a suitable adjustment means 19.

Figure 6:
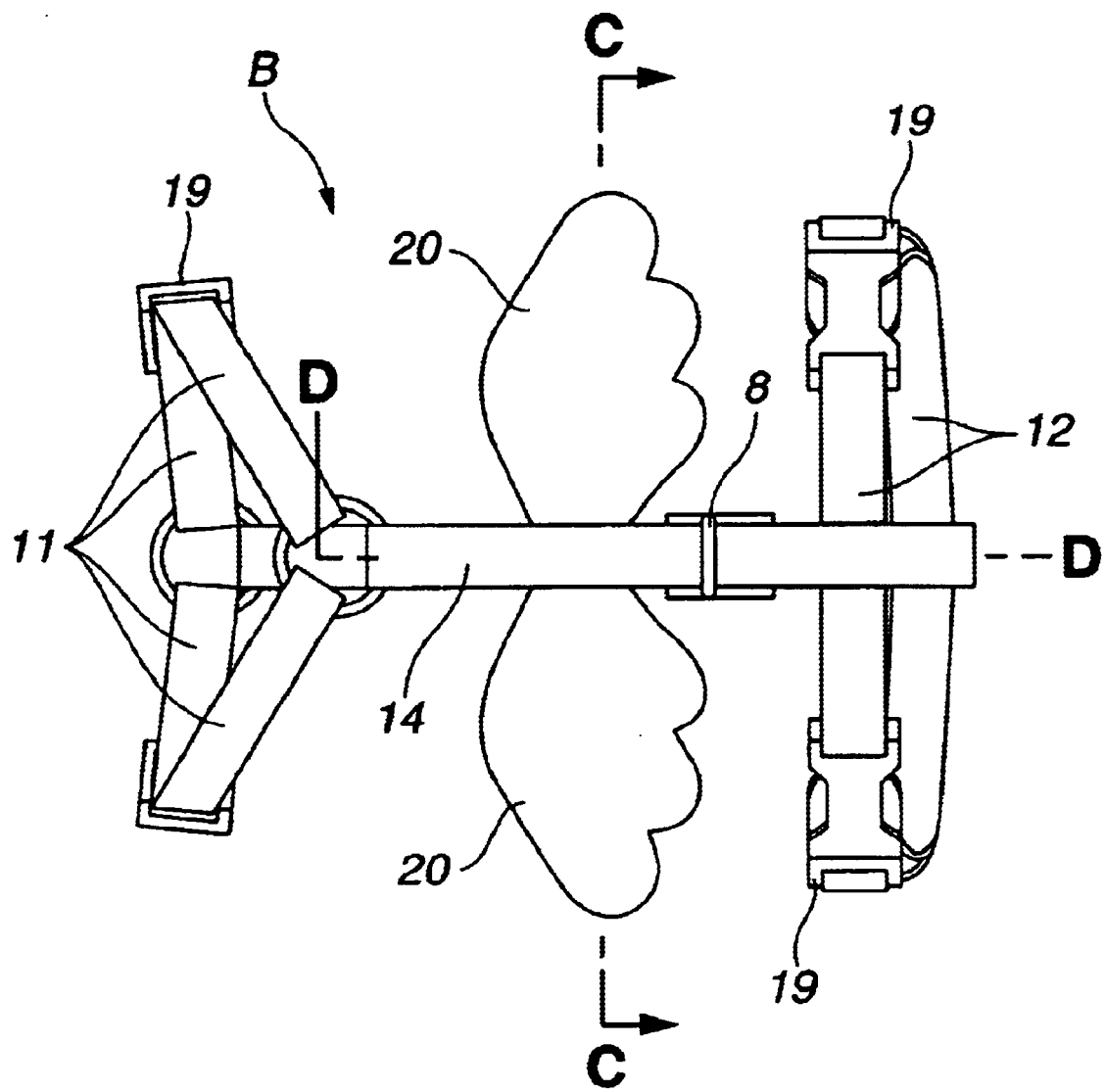
FIG. 6 is a plan view of the harness shown in FIG. 5.
Figure 7:
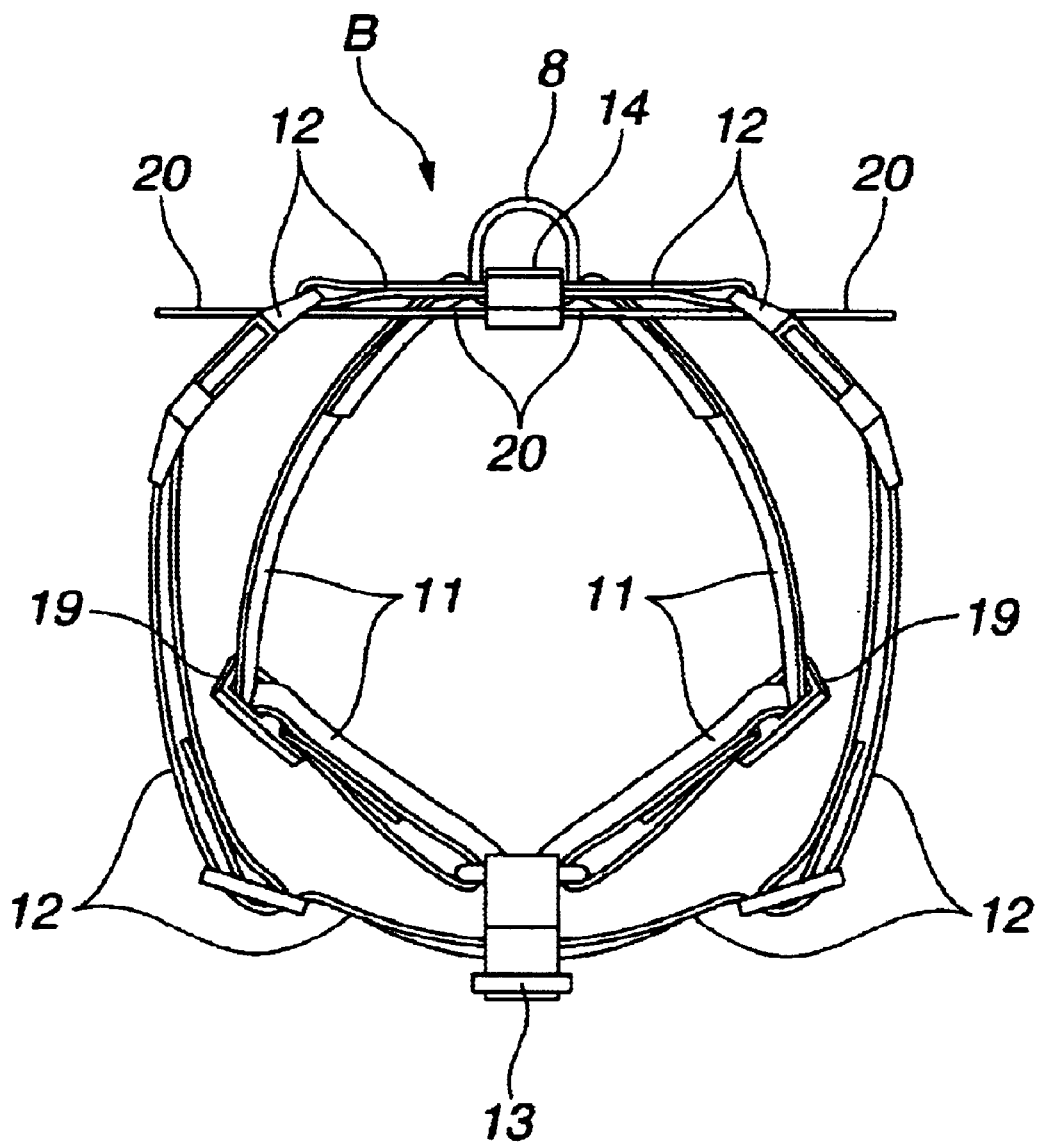
FIG. 7 is a right side elevational view of the harness shown in FIG. 5.
Figure 8:
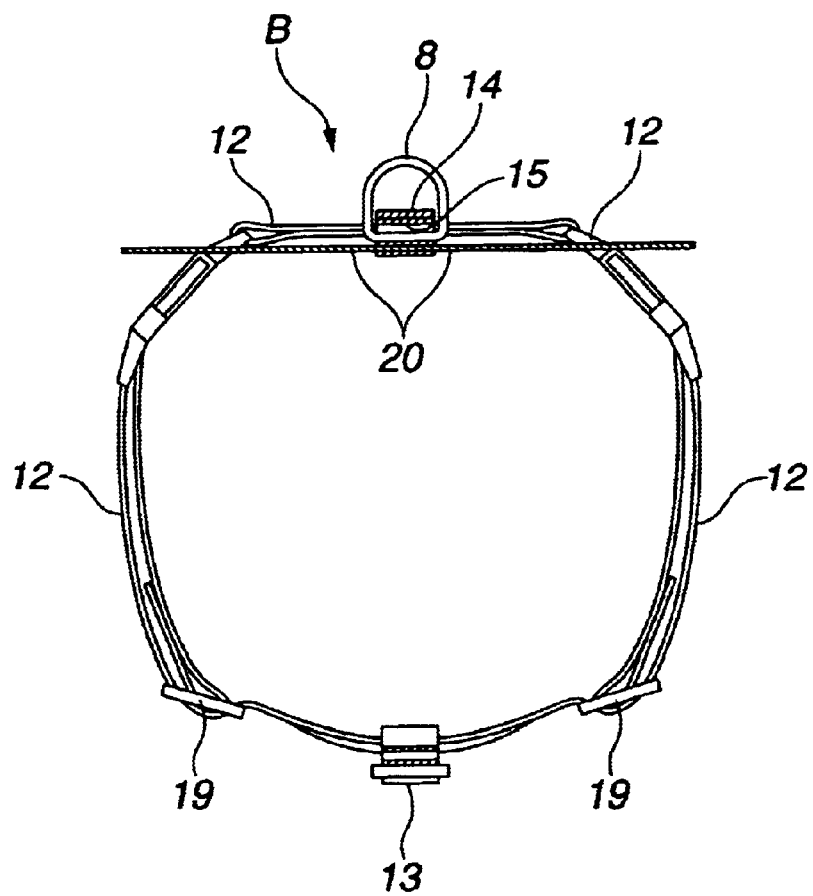
FIG. 8 is a sectional view taken along line C—C of FIG. 6.
Figure 9:
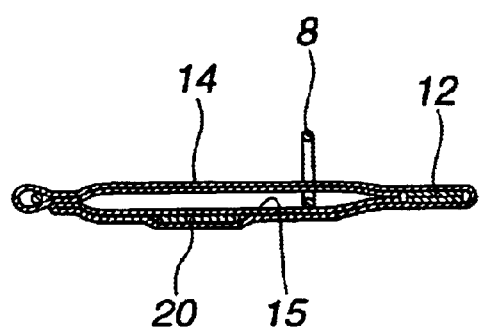
FIG. 9 is a sectional view taken along line D—D of FIG. 6.

In the illustrated embodiment, a means for making a pet 6 look more lovely or charming may be provided. The means includes a wing-like or ala-like decoration 20 mounted on the connection band 14 arranged on the back side of the harness B. The wing-like or ala-like decoration 20 may be formed in imitation of any one selected from the group consisting of a wing of a cupid as shown in FIG. 6, a wing of a bird, an ala of any insect, and other wings and alae.

Such a wing-like or ala-like decoration may be mounted on the connection band 4 on the back side of the harness A of the first embodiment described above, as in the harness B of the second embodiment.

Now, the manner of operation of each of the harnesses A and B of the first and second embodiments will be described.

Figure 4:
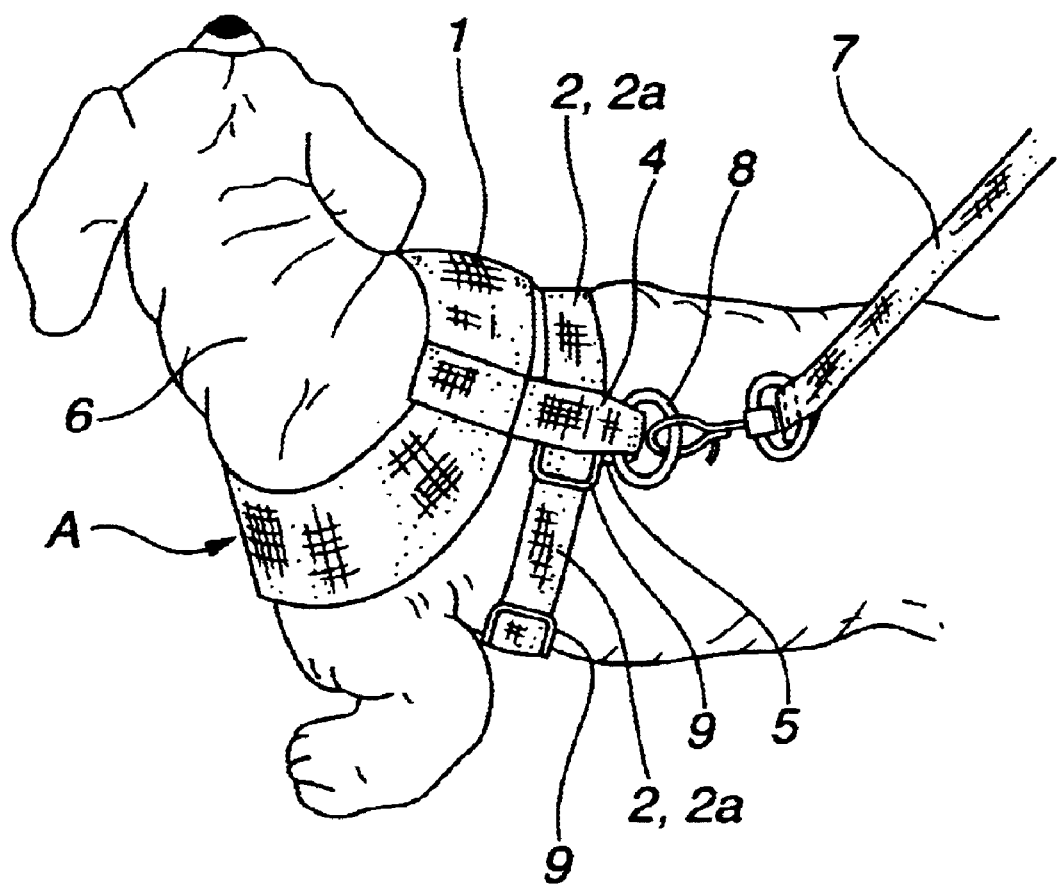
FIG. 4 is a schematic view showing fitting of the harness of FIG. 1 on a dog.
Figure 5:
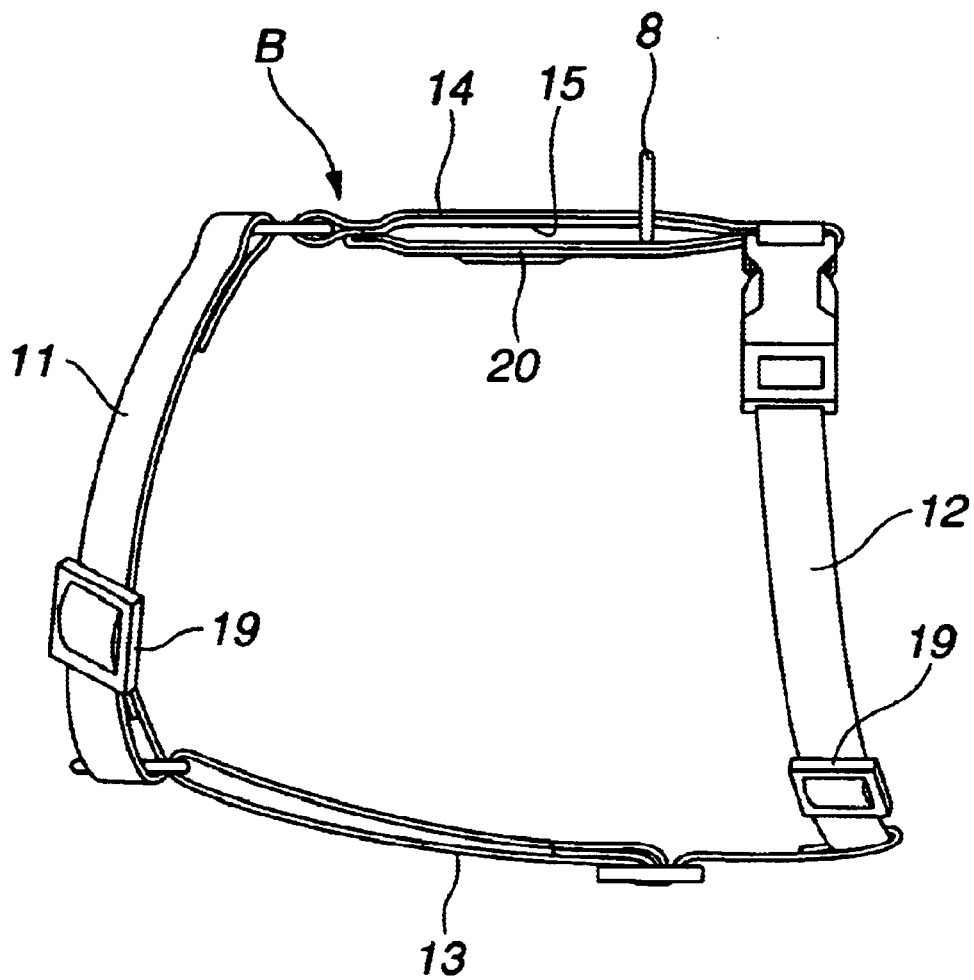
FIG. 5 is a front elevational view showing another embodiment of a harness according to the present invention.

In the harness A of the first embodiment, as shown in FIG. 4, a head of a pet 6 is inserted through the collar section 1, resulting in the collar section 1 being fitted on a neck of the pet 6. Also, forelegs of the pet 6 are inserted through lateral portions of the connection section 3 on the ventral side, so that the connection section 3 may be positioned on a region of the pet 6 extending from a chest of the pet 6 to an abdomen thereof and the harness section 2 may be wound on a region of the pet positioned immediately rearwardly of the forelegs. Then, the harness section 2 is subjected to adjustment of a length thereof so that it may be fitted to a trunk of the pet. Then, the lead 7 is fastened at a distal end thereof to the lead connection ring 8 of the connection band 4 on the back side.

When the pet moves forwardly or rearwardly of an owner of the pet during a walk thereof to pull the lead 7 while having the harness A fitted thereon, the ring 8 movably fitted on the loop 5 of the connection band 4 on the back side is moved rearwardly or forwardly in correspondence to movement of the pet. Also, when the pet 6 moves in either a left side direction or a right side direction to pull the lead 7, the back portion 2a of the harness section 2 wound on the trunk of the pet 6 may be freely moved in a longitudinal load direction and/or a lateral load direction along the loop 5 of the connection band 4.

Figure 10:
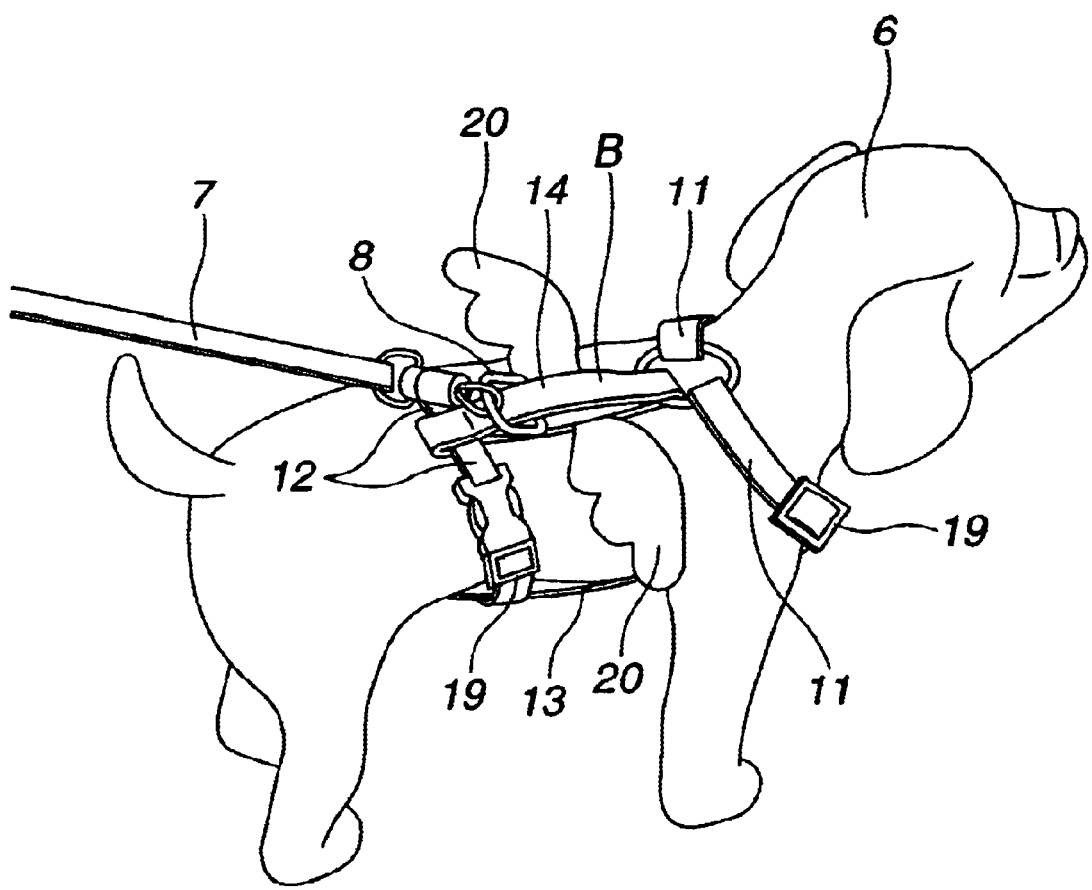
FIG. 10 is a schematic view showing fitting of the harness of FIG. 5 on a dog.

In the harness B of the second embodiment, as shown in FIG. 10, the collar section 11 is fitted on a neck of the pet 6 while adjusting a length thereof and then the harness section 12 wound on a trunk of the pet 6 while adjusting a length thereof. Then, the lead 7 is fastened at a distal end thereof to the lead connection ring 8 of the connection band 14 on the back side.

As described above, the harness A of the first embodiment is so constructed that the collar section 1, the harness section 2 and the connection section 3 on the ventral side each are formed into an increased width, to thereby be satisfactorily fitted to a figure of a pet. Such construction of the first embodiment permits the harness A to be soft to a body of the pet to a degree sufficient to lighten a burden on a body of the pet. Also, it permits an owner of the pet to control the pet as desired.

Also, in the harness A, the loop 5 of the connection band 4 has the lead connection ring 8 and the back portion of the harness section 2 movably fitted thereon. This permits the ring 8 and harness section 2 to be freely moved in correspondence to movement of the pet, to thereby effectively prevent reversal and torsion of the collar and harness sections 1 and 2, torsion of the whole harness A, displacement thereof to a side of a pet and the like, so that the harness A may be significantly convenient to both owner and pet.

The parts of the harness A each are formed into an increased width as in a vest. This results in the harness A being increased in degree of freedom of design thereof. Also, it permits not only a variety of materials different in color, pattern and the like to be used for the harness, but a material for a boa to be used for a lining of the harness, so that the harness may exhibit a cold-proof function.

Likewise, the harness B of the second embodiment constructed as described above permits the lead connection ring 8 and harness section 12 to be freely moved in correspondence to any movement of a pet during a walk thereof, to thereby effectively prevent disadvantages such as reversal and torsion of the collar and harness sections, a failure in control of the pet by an owner, a failure to provide the pet with comfortableness and the like.

Further, in each of the harnesses A and 8, the connection band on the back side may be mounted thereon with the wing-like or ala-like decoration. This makes a pet look more lovely or charming.

As can be seen from the foregoing, the harness of the present invention is so constructed that the collar section, the harness section, and the connection band and connection section each for connecting the collar and harness sections to each other therethrough are formed into an increased width in conformity to a body of a pet and so as to be continuous with each other. Also, the harness section has the back portion formed so that a length thereof may be adjusted. The connection band through which the collar section and harness section are connected to each other on the back side is formed into a loop. The harness section has the back portion inserted through the loop of the connection band in a manner to be movable in both longitudinal and lateral directions of the harness. Further, the lead is connected to the loop of the connection band either through the lead connection ring fitted on the connection band so as to be movable in the longitudinal direction or by fitting a distal end of the lead on the connection band so as to be movable in the longitudinal direction. Such construction of the harness effectively prevents troubles such as reversal and/or torsion of the collar section and/or harness section, a failure in control of the pet by an owner, a failure to ensure comfortable movement of the pet and the like.

Also, the harness of the present invention may be constructed in such a manner that the collar section, harness section, connection band and connection section are formed so as to be continuous with each other and the connection band is formed into the loop. Also, the harness further includes the lead connected to the loop of the connection band either through the lead connection ring fitted on the connection band so as to be movable in a longitudinal direction of the harness or by fitting a distal end of the lead on the connection band so as to be movable in the longitudinal direction. Such construction effectively prevents troubles such as reversal and torsion of the collar and harness, a failure in control of a pet by an owner, a failure in comfortable movement of the pet and the like.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A harness for a pet, comprising:
  a collar section, a harness section, a connection section for connecting said collar section and harness section to each other therethrough on a ventral side, a connection band for connecting said collar section and harness section to each other therethrough on a back side;
  said collar section, said harness section, and said connection section for connecting said collar and harness sections to each other therethrough being formed so as to have an increased width for conformity with a body of a pet and so as to be continuous with each other;
  said harness section having a back portion formed so as to have an adjustable length;
  said connection band through which said collar section and harness section are connected to each other on a back side comprises a loop;
  said harness section having a back portion inserted through said loop of said connection band in a manner to be movable in both longitudinal and lateral directions of said harness length; and
  a lead connected to said loop of said connection band either through a lead connection ring fitted on said connection band so as to be movable in the longitudinal direction or by fitting a distal end of said lead on said connection band so as to be movable in the longitudinal direction,
  wherein said connection band is provided thereon with a wing-like or ala-like decoration.

2. A harness for a pet, comprising:
  a collar section, a harness section, a connection section for connecting said collar section and harness section to each other therethrough on a ventral side, a connection band for connecting said collar section and harness section to each other therethrough on a back side;

said collar section, said harness section, and said connection section for connecting said collar and harness sections to each other therethrough being formed so as to have an increased width for conformity with a body of a pet and so as to be continuous with each other;

said harness section having a back portion formed so as to have an adjustable length;

said connection band through which said collar section and harness section are connected to each other on a back side comprises a loop;

said harness section having a back portion inserted through said loop of said connection band in a manner to be movable in both longitudinal and lateral directions of said harness length; and a lead connected to said loop of said connection band either through a lead connection ring fitted on said connection band so as to be movable in the longitudinal direction or by fitting a distal end of said lead on said connection band so as to be movable in the longitudinal direction, wherein said connection band is provided thereon with a decoration in imitation of any one selected from the group consisting of a wing of a cupid, an ala of an insect, and other wings and alae.

3. A harness for a pet, comprising:

a collar section of which a length is adjustable, a harness section, a connection band for connecting said collar and harness sections to each other therethrough on a back side, and a connection section for connecting said collar and harness sections to each other therethrough on a ventral side;

said collar section, harness section, connection band and connection section being formed so as to be continuous with each other;

said connection band being formed into a loop; and a lead connected to said loop of said connection band either through a lead connection ring fitted on said connection band so as to be movable in the longitudinal direction of said harness or by fitting a distal end of said lead on said connection band so as to be movable in the longitudinal direction, wherein said connection band is provided thereon with a wing-like or ala-like decoration.

4. A harness for a pet, comprising:

a collar section of which a length is adjustable, a harness section, a connection band for connecting said collar and harness sections to each other therethrough on a back side, and a connection section for connecting said collar and harness sections to each other therethrough on a ventral side;

said collar section, harness section, connection band and connection section being formed so as to be continuous with each other;

said connection band being formed into a loop; and a lead connected to said loop of said connection band either through a lead connection ring fitted on said connection band so as to be movable in the longitudinal direction of said harness or by fitting a distal end of said lead on said connection band so as to be movable in the longitudinal direction, wherein said connection band is provided thereon with a decoration in imitation of any one selected from the group consisting of a wing of a cupid, an ala of an insect, and other wings and alae.

* * * * *